US007015450B2

(12) United States Patent
Mikhailov et al.

(10) Patent No.: US 7,015,450 B2
(45) Date of Patent: Mar. 21, 2006

(54) DETECTION APPARATUS FOR THE OPTICAL DETECTION OF AN OBJECT, METHOD FOR OPERATING A DETECTION APPARATUS OF THIS TYPE AND SCANNING APPARATUS AND CONFOCAL MICROSCOPE

(75) Inventors: Aleksei Mikhailov, Dortmund (DE); Vitalij Lissotschenko, Fröndenberg (DE); Maxim Darscht, Dortmund (DE)

(73) Assignee: Hentze-Lissotschenko Patentverwaltungs GmbH Co. KG, (DE)

( * ) Notice: Subject to any disclaimer, the term of this patent is extended or adjusted under 35 U.S.C. 154(b) by 42 days.

(21) Appl. No.: 10/756,823

(22) Filed: Jan. 14, 2004

(65) Prior Publication Data

US 2004/0169843 A1 Sep. 2, 2004

(30) Foreign Application Priority Data

Jan. 18, 2003 (DE) ................................ 103 01 775

(51) Int. Cl.
*H01J 40/14* (2006.01)
*G02B 27/10* (2006.01)

(52) U.S. Cl. .................. 250/208.1; 250/216; 359/623; 359/624

(58) Field of Classification Search ............ 250/208.1, 250/203.1, 216, 221, 222.1, 201.3, 234; 359/619, 359/621, 623 X, 624 X, 639
See application file for complete search history.

(56) References Cited

U.S. PATENT DOCUMENTS

| | | | | |
|---|---|---|---|---|
| 5,150,259 | A * | 9/1992 | Oishi | 359/619 |
| 5,595,930 | A | 1/1997 | Baek | |
| 5,847,867 | A | 12/1998 | Sugiyama et al. | |
| 5,969,846 | A | 10/1999 | Kishi | |
| 6,577,447 | B1 | 6/2003 | Ai et al. | |
| 2002/0114077 | A1 | 8/2002 | Javidi | |

FOREIGN PATENT DOCUMENTS

| | | |
|---|---|---|
| DE | 196 32 594 | 2/1998 |
| DE | 199 17 890 | 11/2000 |
| EP | 0 485 803 A1 | 5/1992 |
| JP | 2001083417 A * | 3/2001 |
| WO | WO 97/34171 | 9/1997 |

* cited by examiner

*Primary Examiner*—Kevin Pyo
(74) *Attorney, Agent, or Firm*—Hoffman Wasson & Gitler

(57) ABSTRACT

Detection apparatus for the optical detection of an object including detection means, which can detect the light emerging from the object, and also at least one imaging unit comprising first lens means having a plurality of lens elements arranged in the form of an array, through which light emerging from the object can pass; and second lens means, which are arranged between the first lens means and the detection means and can feed the light that has passed through the lens elements to the detection means, the second lens means having a plurality of lens elements arranged in the form of an array. Furthermore, the present invention relates to a method for operating a detection apparatus of this type and to a scanning apparatus and to a confocal microscope having a detection apparatus of this type.

17 Claims, 4 Drawing Sheets

1
2
3
5
7
14
15
16
17
18
19
20
21
22
23
24
25
26
27
27a
27b
28
29
30
31
32
33
34
34a
34b
35
X
Z

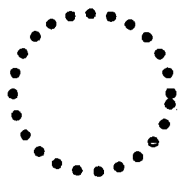
Fig 6a
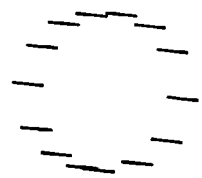
Fig 6b
Fig 6c
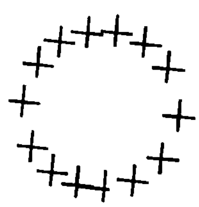
Fig 6d
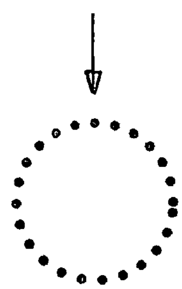
Fig 6e
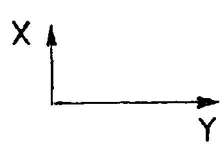

DETECTION APPARATUS FOR THE OPTICAL DETECTION OF AN OBJECT, METHOD FOR OPERATING A DETECTION APPARATUS OF THIS TYPE AND SCANNING APPARATUS AND CONFOCAL MICROSCOPE

BACKGROUND OF THE INVENTION

The present invention relates to a detection apparatus for the optical detection of an object including detection means, which can detect the light emerging from the object, and also at least one imaging unit including a first lens means having a plurality of lens elements arranged in the form of an array, through which light emerging from the object can pass; and a second lens means, which are arranged between the first lens means and the detection means and can feed the light that has passed through the lens elements to the detection means. Furthermore, the present invention relates to a method for operating a detection apparatus of this type. Furthermore, the present invention relates to a scanning apparatus and to a confocal microscope in each case having a detection apparatus of this type.

A detection apparatus, a method, a scanning apparatus and a confocal microscope of the abovementioned type are disclosed in the international patent application WO 97/34171 A2. The detection apparatus described therein has on the object side, a two-dimensional array of, in particular, spherical lenses which have a very large numerical aperture. The light emerging from the comparatively small lenses of the array is imaged onto the detection means by an imaging system comprising a plurality of lenses arranged one after the other, for example four lenses, and having a comparatively small aperture and a central aperture diaphragm arranged approximately in the center in the direction of propagation. Arranged between the imaging system and the detection means are beam splitter means for coupling in light with which the object can be illuminated.

What proves to be disadvantageous in the case of a detection apparatus of this type is that, on the one hand, on account of the use of the spherical lenses in the lens array, the luminous efficiency is comparatively low on account of interstices between the individual spherical lenses. On the other hand, the system is of comparatively complicated construction with five or more lenses one behind the other and also a central aperture diaphragm and further smaller aperture diaphragms behind each of the small spherical lenses. This construction means that the detection apparatus is difficult to adjust, on the one hand, and is not very effective, on the other hand.

The problem on which the present invention is based is to provide a detection apparatus of the type mentioned in the introduction which is of simple construction and operates effectively. Furthermore, a problem of the present invention is to specify a method for operating a detection apparatus of this type. Furthermore, the present invention is based on the problem of providing a scanning apparatus and also a confocal microscope having a detection apparatus of this type.

SUMMARY OF THE INVENTION

It is provided that the second lens means have a plurality of lens elements arranged in the form of an array, and wherein the lens elements of the first and/or of the second lens means have, at least in sections, a cylinder geometry or a cylinder-like geometry. The use both of an array of lens elements in the second lens means and of an array of lens elements in the first lens means opens up the possibility of operating the detection apparatus in multichannel fashion. In this case, in particular the beam path through each of the optical channels from the object up to the detection means may be completely independent of the other beam paths in other channels. This means that the imagings of different points on the surface of the object to be detected preferably do not lie one above the other in any plane perpendicular to the optical axis. In this case, the optical axis may be, by way of example, an essentially centrally arranged perpendicular connecting line between the detection means and the object. A cylinder geometry of this type makes it possible to improve the resolution of the detection apparatus according to the invention compared with the detection apparatuses known from the prior art. In particular, the light throughput through the lens means can also be increased by the choice of a cylinder geometry or a cylinder-like geometry. Furthermore, a better contrast results from cylindrical lenses or cylinder-like lenses.

In accordance with a preferred embodiment of the present invention, it may be provided that the light that has passed through one of the lens elements of the first lens means essentially passes through precisely one of the lens elements of the second lens means. This results in a multichannel detection apparatus in which both the array of the first lens means and the array of the second lens means have approximately the same number of lens elements. Furthermore, as already mentioned above, no crosstalk occurs between the individual channels of the detection apparatus.

Preferably, the lens elements of the first and/or of the second lens means are in each case formed by at least two cylindrical lenses or cylinder-like lenses, the cylinder axes of said cylindrical lenses or cylinder-like lenses preferably forming an angle of 90° with one another. Through these mutually crossed cylindrical lenses, individual points of the object can be imaged onto the detection means without difficulty.

According to the invention, it may be provided that the detection apparatus furthermore comprises scanning means by means of which the at least one imaging unit can be displaced with respect to the object and/or with respect to the detection means in at least one scanning direction. By virtue of scanning means of this type, the detection apparatus is suitable as a scanning apparatus and as a confocal scanning microscope.

In accordance with a preferred embodiment of the present invention, the direction in which the lens elements of the first and/or of the second lens means are arranged next to one another in an array forms an angle not equal to 0° and/or 90° with the at least one scanning direction. What is achieved by the angle not equal to 0° and/or 90° between scanning direction and arrangement direction of the lens elements in the array is that mutually adjacent lens elements trace scanning lines on the object which are at a comparatively small distance from one another. This enables a high-resolution raster-like detection of the area of the object that is to be examined. Instead of this tilting of the lens means with respect to the scanning direction, the lens elements in the lens means may also be arranged offset with respect to one another in order to enable scanning lines that are at a small distance from one another on the object through adjacent lens elements.

According to the invention, it is possible for the detection apparatus to comprise at least one first imaging unit and at least one second imaging unit. These may be arranged for example one after the other in the scanning direction, so that firstly the first imaging unit images the object onto the detection means and afterward the second imaging unit images the object onto the detection means.

According to the invention, it is possible for the at least one first imaging unit to have a resolution which differs from the resolution of the at least one second imaging unit. In this case, preferably by successively carrying out the imagings with these two imaging units which have different resolutions, it is possible afterward to compose a high-resolution image of the object for example after read-out from the detection means in the computer.

In this case, it may be provided that the at least one first imaging unit has a higher resolution in a first direction than in a second direction perpendicular thereto, whereas the at least one second imaging unit has a higher resolution in the second direction than in the first direction perpendicular thereto. It is thus possible to carry out a high-resolution imaging in a first direction with the first imaging unit and a high-resolution imaging in the second direction perpendicular thereto with the second imaging unit. In this case, the imaging units may be designed specifically for the high-resolution imaging in one direction and the poorer imaging in the direction perpendicular thereto. This can be realized comparatively simply particularly in the case of mutually crossed cylindrical lenses within the first and second lens means. Overall, such staggered detection with two imaging units which exhibit high resolution in mutually perpendicular directions enables a significantly higher-resolution image to be detected than is possible with detection apparatuses from the prior art.

Furthermore, the invention affords the possibility that the resolution of the at least one imaging unit can be varied, in particular can be varied differently in two mutually perpendicular directions. In this case, it is possible for example to position perforated masks with different opening sizes before the lens arrays of the first and/or of the second imaging unit. Under certain circumstances, it is also possible to use diaphragms which can be opened and closed.

In accordance with a preferred embodiment of the present invention, it is possible for at least some of the lens elements of the first and/or of the second lens means to comprise at least two parts. Such partite lens elements make it possible to detect in particular stereoscopic imagings of individual points of the object.

In this case, the lens elements comprising at least two parts can split the light that emerges from a point of the object and impinges on them into two partial beams in such a way that the points of impingement of said partial beams on the detection means can provide information about the position of the point in a direction perpendicular to the surface of the object. In addition to the two-dimensional image information items already made available by the, in particular, two-dimensional array, the partite lens elements thus also make it possible to obtain items of information about the third dimension, so that, in particular, a three-dimensional image of the regions of the object that are to be examined can be obtained.

As an alternative or in addition thereto, it is possible for the scanning means to be configured in such a way that, in a first scanning position, the light emerging from a point of the object impinges on a first point of impingement on the detection means, and that, in a second scanning position, the light emerging from the same point of the object impinges on a second point of impingement—at a distance from the first point of impingement—on the detection means, the points of impingement being able to provide information about the position of the point in a direction perpendicular to the surface of the object. In this case, by way of example, in the two abovementioned scanning positions, the light emerging from the point may pass in each case through one and the same lens element of the first lens means and/or one and the same lens element of the second lens means. In particular, the scanning positions could be driven for example by scanning steps corresponding to half a scanning step width.

In the method according to the invention for operating a detection apparatus, it is provided that, in a first method step, an object is imaged onto the detection means by a first imaging unit, which is displaced with respect to the object in the scanning direction, and wherein, in a second method step, the object is imaged onto the detection means by a second imaging unit, which is displaced with respect to the object in the same scanning direction. As already mentioned above, such double or multiple detection with different imaging units makes it possible to obtain a high-resolution image of the object in two mutually perpendicular directions.

The invention affords the possibility that the imagings by the first imaging unit and by the second imaging unit are carried out with different resolutions. The imagings obtained in this way can be combined with one another to form a high-resolution imaging after read-out of the detection means in the computer, for example.

In particular, it may be provided in this case that the imagings by the first imaging unit and by the second imaging unit are carried out with different resolutions in mutually perpendicular directions, the first imaging unit achieving a higher-resolution imaging in a first direction and the second imaging unit achieving a higher-resolution imaging in the second direction perpendicular thereto.

In the method according to the invention, it may be provided that the image information items which are recorded successively by the detection means with the two imaging unit's are combined with one another in order to obtain a high-resolution image of the object. For the case where the detection means are embodied as CCD chips, for example, the image information items are transmitted as digital data into a computer and can be combined there to form a high-resolution image of the object in at least two mutually perpendicular directions.

BRIEF DESCRIPTION OF THE DRAWINGS

Further features and advantages of the present invention will become clear from the following description of preferred exemplary embodiments with reference to the accompanying figures, in which

FIG. 6*a* shows an example of an object to be detected;

FIG. 6*b* diagrammatically shows the imaging of the object onto the detection means with a first imaging unit;

FIG. 6c shows the imaging of the object onto the detection means with a second imaging unit;

FIG. 6d shows the combination of the imagings in accordance with FIG. 6b and FIG. 6c; and FIG. 6e shows a computer-processed imaging of the object in accordance with FIG. 6a which results from FIG. 6d.

DETAILED DESCRIPTION OF THE INVENTION

Figure 1:
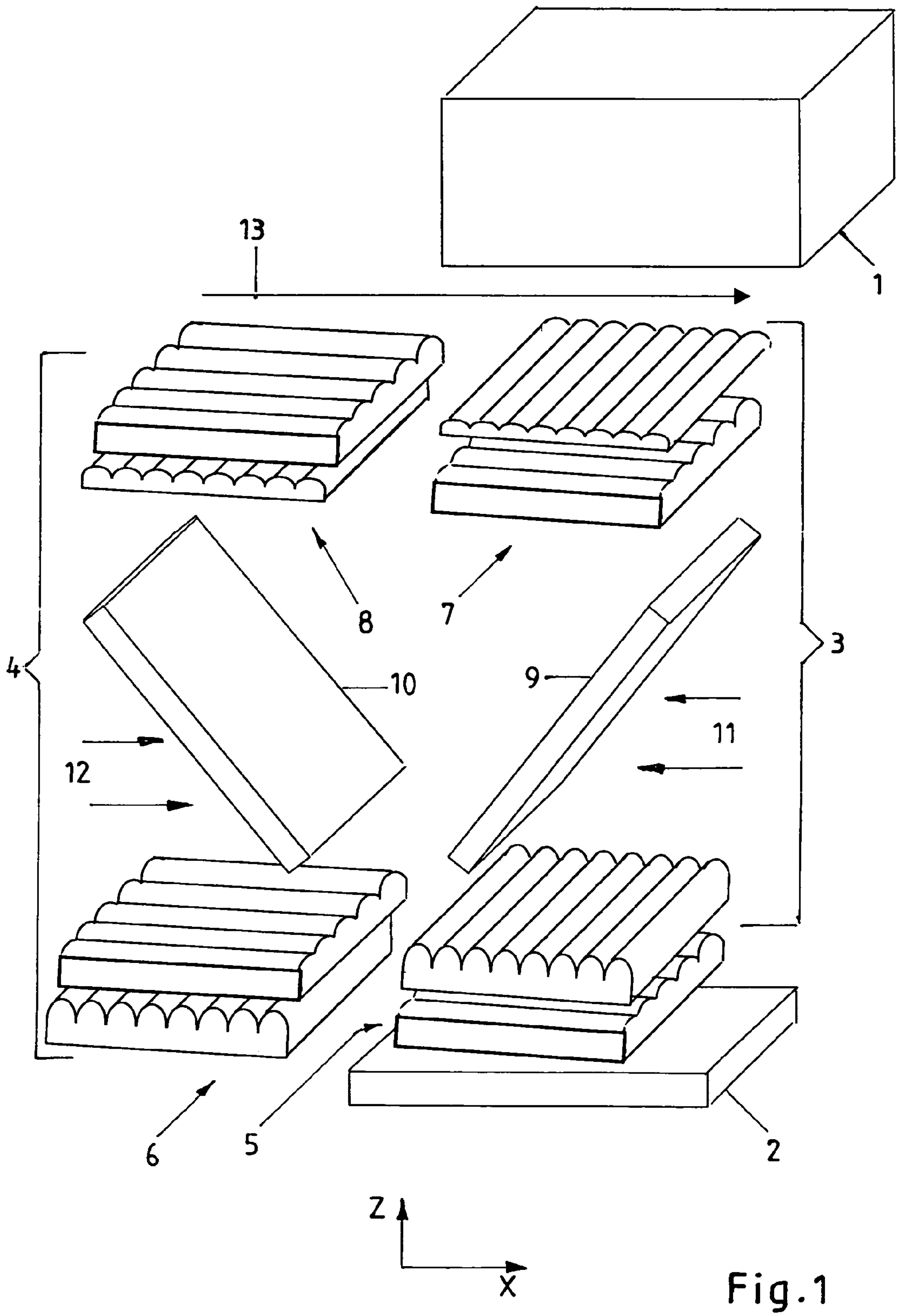
FIG. 1 shows a diagrammatic perspective view of a detection apparatus according to the invention.

FIG. 1 reveals that a detection apparatus according to the invention comprises detection means 1, which may be embodied for example as a CCD chip or the like. The detection means 1 can detect light from an object 2 by way of imaging units that will be described in more detail below. The object 2 may be, for example, a surface to be scanned, for example the surface of a wafer or the like. Another possible object to be detected by the detection apparatus according to the invention may be, for example, a mask for lithographic applications.

The detection apparatus represented in FIG. 1 comprises two imaging units 3, 4. Each of these imagings units 3, 4 comprises first lens means 5, 6 and second lens means 7, 8. The first lens means of the first imaging unit 3, which is on the right in FIG. 1, are arranged adjacent to the object 2 in the state represented in FIG. 1, whereas the second lens means 7 of the first imaging unit 3 are arranged at a distance from the first lens means 5 in the vicinity of the detection means 1.

The first and second lens means 5, 6, 7, 8 are in each case embodied as two mutually crossed arrays of cylindrical lenses or cylinder-like lenses, so that a two-dimensional array of lens elements is formed in each of the lens means 5, 6, 7, 8. In the exemplary embodiment represented in FIG. 1, by way of example, the first lens means 5 of the first imaging unit 3 comprises two substrates, an array of cylindrical lenses being formed in each of the substrates and the two arrays having cylinder axes that are perpendicular to one another. It is also perfectly possible for the first and second lens means 5, 6, 7, 8 in each case to comprise only one substrate, the mutually crossed arrays of cylindrical lenses then being formed in said substrate, for example on mutually opposite areas.

The imaging units 3, 4 may furthermore comprise mirrors 9, 10, through which laser beam pencils 11, 12 or beam pencils of white light or the like which are incident on the side, for example, can be reflected onto the first lens means 5, 6 and via the latter onto the object 2. The mirrors 9, 10 may be partly reflective mirrors through which light that has been reflected back on the object 2 and has passed through the lens elements of the first lens means 5, 6 can pass to the second lens means 7, 8 and through the latter to the detection means 1. The arrow 13 designates the scanning direction, that is to say the direction in which the imaging units 3, 4 can be moved with respect to the object 2 and the detection means 1 in order to detect larger parts of the surface of the object 2. The imaging units 3, 4 are thus essentially moved toward the right in FIG. 1.

In the exemplary embodiment represented in FIG. 1, the mirrors 9, 10 are arranged between the first lens means 5, 6 and the second lens means 7, 8. However, according to the invention, it is also perfectly possible to arrange the mirrors 9, 10 between the second lens means 7, 8 and the detection means 1.

Figures 5A, 5B:
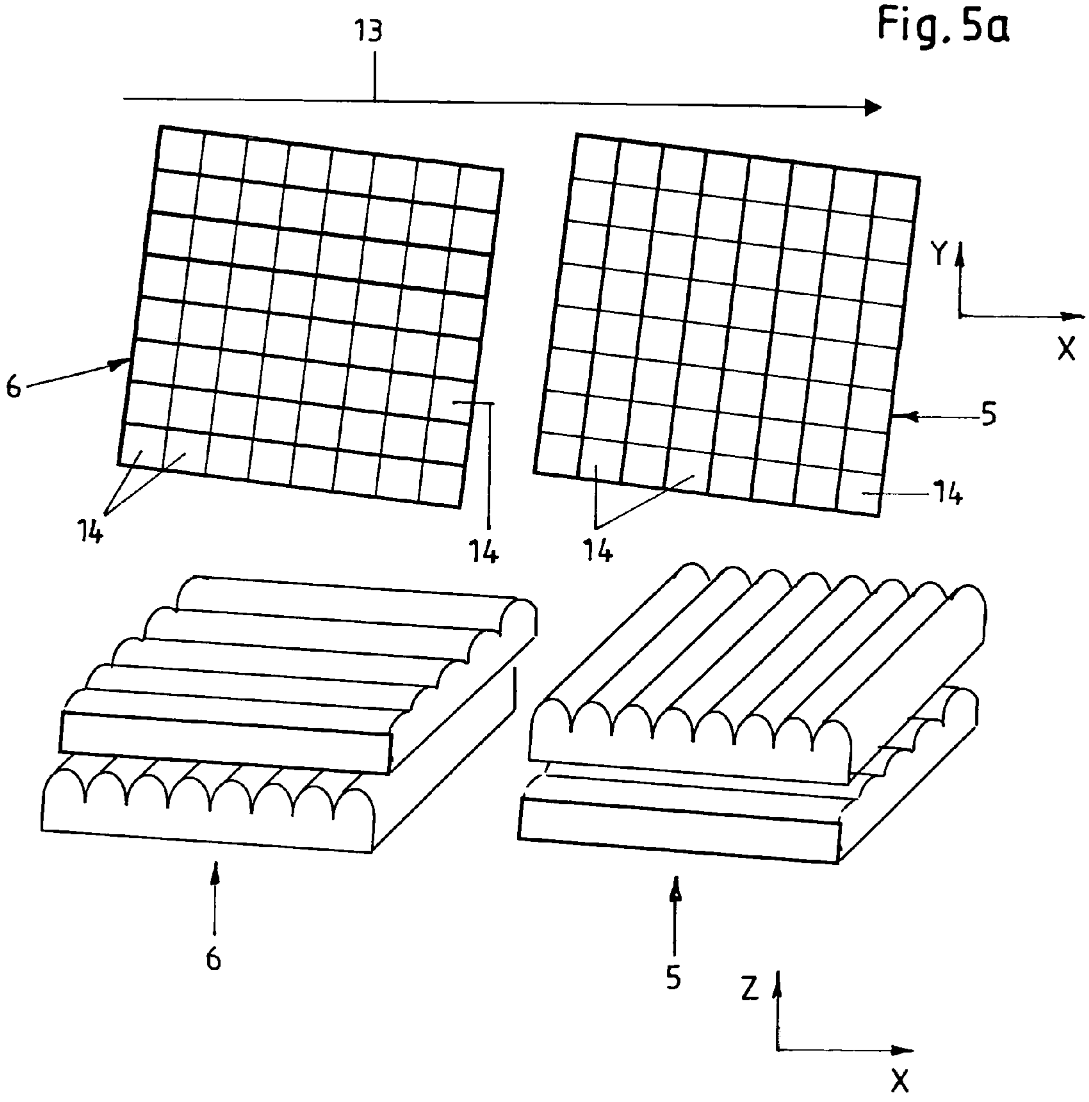
FIG. 5*a* shows a plan view of first lens means of the detection apparatus in accordance with FIG. 1.
FIG. 5*b* shows a perspective view of the lens means in accordance with FIG. 5*a;*

FIGS. 5a and 5b again clearly reveal the movement of the first lens means 5, 6 of the imaging units 3, 4. The lens elements 14 resulting from the mutually crossed cylindrical lenses are again illustrated clearly in the plan view in accordance with FIG. 5a. FIG. 5a likewise clearly reveals that the first lens means 5, 6 are slightly rotated with respect to the scanning direction 13, so that lens elements 14 that are adjacent to one another in the X direction (see the depicted system of Cartesian coordinates) trace scanning lines on the object 2 that are at a small distance from one another in the Y direction. This slight tilting of the lens means 5, 6 with respect to the scanning direction 13 thus enables a comparatively high-resolution raster-like detection of the area of the object 2 that is to be examined. FIG. 1 likewise reveals that the second lens means 7, 8 are also slightly rotated, essentially precisely like the first lens means 5, 6, with respect to the scanning direction 13 in the XY plane.

Figures 2, 3, 4:
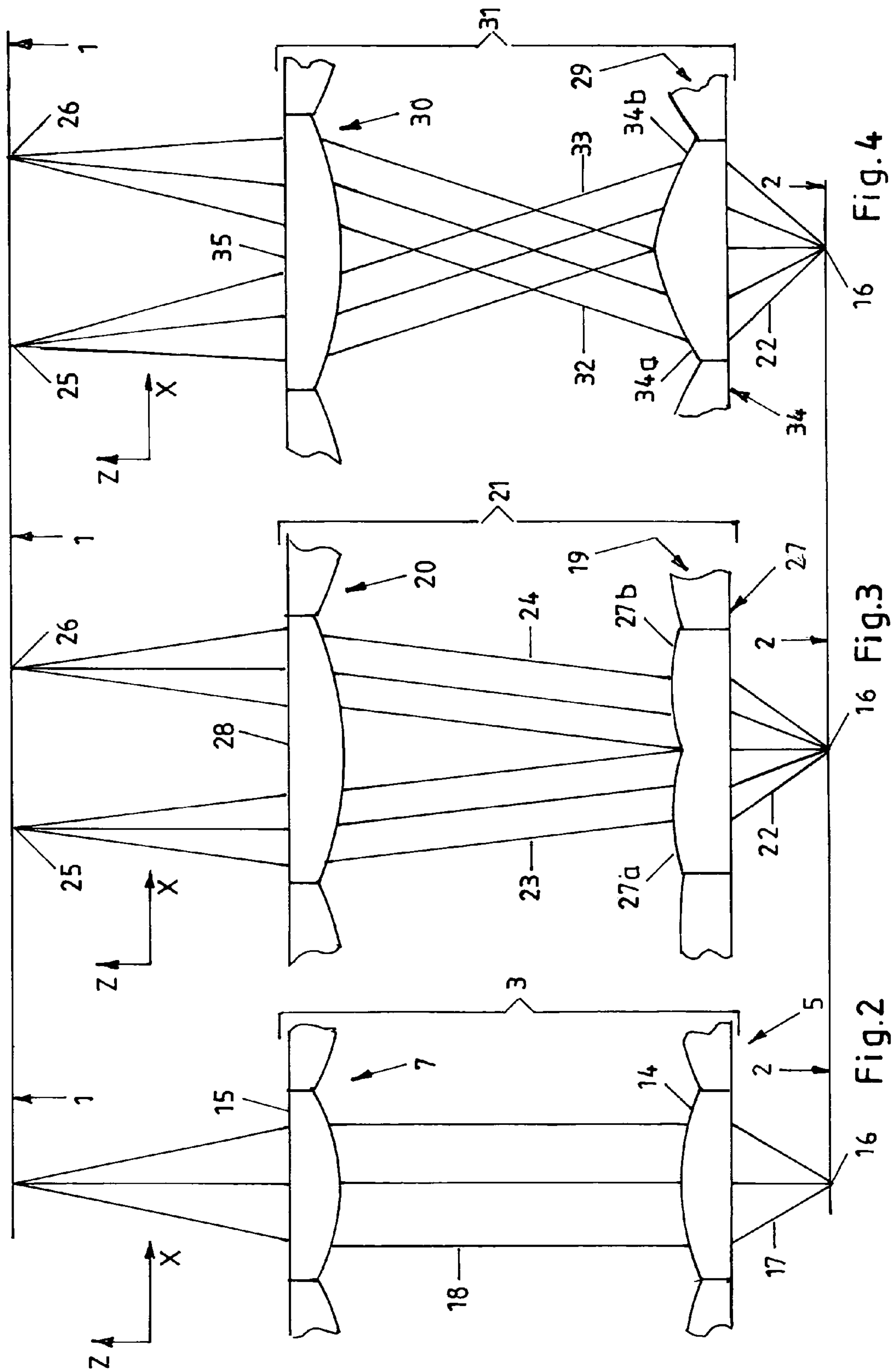
FIG. 2 diagrammatically shows the beam path in a detection apparatus in accordance with FIG. 1.
FIG. 3 diagrammatically shows the beam path in a further embodiment of a detection apparatus according to the invention.
FIG. 4 diagrammatically shows the beam path in a further embodiment of a detection apparatus according to the invention.

The lens means are illustrated in a simplified manner in FIG. 2, FIG. 3 and FIG. 4. In particular, the lens means are not represented as in each case two mutually separate substrates with arrays of mutually crossed cylindrical lenses accommodated therein. Rather, for illustration purposes, each of the lens elements is illustrated as a nonpartite or partite planoconvex lens. However, according to the invention, it is perfectly possible for the beam paths represented in FIG. 2, FIG. 3 and FIG. 4 to be able to be generated by lens means which comprise two or more substrates with arrays of cylindrical lenses or cylinder-like lenses accommodated therein.

FIG. 2 diagrammatically illustrates the beam path through the imaging unit 3. In this case, ultimately only a lens element 14 of the first lens means 5 and a lens element 15 of the second lens means 7 are illustrated. Light 17 emerging from a point 16 on the object 2 is essentially collimated by the lens element 14 of the first lens means 5. Consequently, in the exemplary embodiment illustrated, the lens element 14 has a focal length essentially corresponding to the distance between lens element 14 and object 2. The collimated light 18 impinges on a lens element 15 of the second lens means 7 and is focused onto a point of the detection means 1 by said lens element. In this case, too, the focal length of the lens element 15 approximately corresponds to the distance between lens element 15 and detection means 1.

The first lens means 5, 6 and the second lens means 7, 8 are configured and arranged in particular in such a way that the light which passes through one of the lens elements 14 in each case impinges on precisely one of the lens elements 15 and passes through the latter. This results in a multichannel imaging unit 3, 4 in which no crosstalk takes place between the individual channels.

According to the invention, it is possible, through the choice of the focal lengths of the lens elements 14, 15, to have the effect that, by way of example, areas on the object 2 with a dimensioning of about one micrometer are imaged on areas on the detection means 1 formed as a CCD chip, for example, which have a size of 50 $\mu$m, for example. For this purpose, by way of example, the focal length of the imaging elements 14 may be about 100 $\mu$m, whereas the focal length of the lens elements 15 facing the detection means may be about 5 mm.

The invention affords the possibility, in the case of the first imaging unit 3, of configuring the lens means 5 and/or the lens means 7 in such a way that the resolution is greater in a first direction, for example the X direction, than in a second direction perpendicular thereto, for example the Y direction. Furthermore, the invention affords the possibility, in the case of the second imaging unit 4, of configuring the lens means 6 and/or the lens means 8 in such a way that the resolution is greater in the second direction, for example the Y direction, than in the first direction, for example the X direction. In this way, the scanning with the first imaging unit 3 detects a high-resolution image of the object 2 in the first direction and a less highly resolved image in the second direction. The subsequent scanning with the second imaging unit 4 detects a high-resolution image of the object 2 in the second direction and a less highly resolved image in the first direction.

This is illustrated diagrammatically again in FIG. 6*a* to FIG. 6*e*. FIG. 6*a* shows an object 2 by way of example. FIG. 6*b* shows an imaging as may be generated by the first imaging unit 3. It can clearly be seen here that the resolution is greater in the X direction than in the Y direction. FIG. 6*c* shows an imaging as may be achieved with the second imaging unit 4. Here, too, it can clearly be seen that the resolution is significantly greater in the second direction, namely the Y direction, than in the first direction, namely the X direction.

FIG. 6*d* shows the combination of the imagings which have been achieved by the imaging units 3, 4. By means of this combination of the imagings, the precise locations of the points of the object represented in FIG. 6*a* can be precisely localized by means of the crosses. From these entire imaging data, which, by way of example, may be read from the CCD chip into a computer, said computer, with corresponding digital image processing, can produce a high-resolution image—which can be gathered from FIG. 6*e*—of the object represented in FIG. 6*a*.

The combination of two imagings with different resolutions which is illustrated diagrammatically in FIG. 6*a* to FIG. 6*e* also applies quite generally to imaging units which have a different resolution. In this case, the first imaging unit 3 need not have a higher resolution in a first direction than in a second direction perpendicular thereto. Furthermore, the second imaging unit 4 also need not have a higher resolution in a second direction than in the first direction perpendicular thereto. Rather, it is completely sufficient for the two imaging units 3, 4 to have a mutually different resolution. Nevertheless, a comparatively high-resolution image of the object represented in FIG. 6*a* can be produced by the combination of the two imagings in a computer, for example.

FIG. 3 reveals first lens means 19 and second lens means 20 of another embodiment of an imaging unit 21. In this imaging unit 21, some or each of the lens elements 27 in the first lens means 19 are divided into different parts 27*a*, 27*b*. In particular, the lens elements 27 may comprise two parts 27*a*, 27*b* in the X direction and/or two parts in the Y direction (into or out of the plane of the drawing in FIG. 3), so that a plurality or each of the lens elements 27 may comprise two or four parts 27*a*, 27*b*.

By means of the lens elements 27 that are divided, in particular, into two or four parts 27*a*, 27*b*, the light 22 emerging from a point 16 on the object 2 is split into two or four partial beams 23, 24, which diverge from one another. Said partial beams 23, 24 impinge on an associated lens element 28 of the second lens means 20 at a distance from one another or at a distance from one another at least in partial regions, and are focused onto different points of impingement 25, 26 on the detection means 1 by said lens element 28. The displacement in the X direction and respectively in the Y direction of the points of impingement 25, 26 on the detection means 1 is dependent on the distance in the Z direction between the point 16 and the lens element 27. The X and Y coordinates of the points of impingement 25 and 26 on the detection means 1 thus contain items of information about the Z coordinate of the point 16. In this way, a three-dimensional image of the object 2 can be detected with a detection apparatus according to the invention with imaging units 21 in accordance with FIG. 3.

In the embodiment in accordance with FIG. 3, too, it is possible for a plurality of imaging units 21 to be provided, having different resolutions in the X and Y directions, so that a complete high-resolution image of the object 2 or of the area of the object 2 that is to be examined is only obtained by two or more imaging units 21 being scanned past the object 2.

In the embodiment in accordance with FIG. 4, identical parts are provided with identical reference symbols. In particular, in the embodiment in accordance with FIG. 4, an imaging unit 31 with first lens means 29 and second lens means 30 is provided. The lens elements 34 of the first lens means 29 are likewise at least bipartite in the X direction and/or in the Y direction. Two parts 34*a*, 34*b*—arranged next to one another—of one of the lens elements 34 are depicted in the X direction in FIG. 4. The lens elements 34 are configured in such a way that collimated partial beams 32, 33 that have passed through different parts 34*a*, 34*b* cross one another in the interspace between the first lens means 29 and the second lens means 30 and impinge on the lens elements 35 of the second lens means 30 at a distance from one another. The light beams are once again focused on points of impingement 25, 26 on the detection means that are at a distance from one another by said lens means 35.

The detection apparatus according to the invention can be used as a high-resolution scanning apparatus in two or three dimensions. However, it is also perfectly possible to use the detection apparatus according to the invention as a confocal microscope. In particular, a detection apparatus according to the invention may be used as a multichannel confocal microscope which can obtain two- or three-dimensional information about the object to be detected.

LIST OF REFERENCE SYMBOLS

1 Detection means
2 Object
3, 4, 21, 31 Imaging unit
5, 6, 19, 29 First lens means
7, 8, 20, 30 Second lens means
9, 10 Mirrors
11, 12 Laser beam pencils
13 Scanning direction
14, 27, 34 Lens elements of the first lens means
15, 28, 35 Lens elements of the second lens means
16 Point on the object
17, 22 Light emerging from the point
18 Collimated light
23, 24, 32, 33 collimated partial beams
25, 26 Points of impingement on the detection means
27*a*, 27*b*, 34*a*, 34*b* Parts of the lens elements of the first lens means

What is claimed is:

1. A detection apparatus for the optical detection of an object comprising detection means, which can detect the light emerging from the object;

at least one imaging unit comprising first lens means having a plurality of lens elements arranged in the form of an array, through which light emerging from the object can pass;

second lens means, which are arranged between the first lens means and the detection means and can feed the light that has passed through the first lens means to the detection means;

wherein the second lens means have a plurality of lens elements arranged in the form of an array, and wherein the lens elements of the first and/or of the second lens means have, at least in sections, a cylinder geometry or a cylinder-like geometry wherein the lens elements of the first and/or of the second lens means are in each case formed by at least two cylindrical lenses or cylinder-like lenses, the cylinder axes of said cylindrical lenses or cylinder-like lenses forming an angle of 90° with one another.

2. The detection apparatus as claimed in claim 1, wherein the light that has passed through one of the lens elements of the first lens means essentially passes through precisely one of the lens elements of the second lens means.

3. The detection apparatus as claimed in claim 1, wherein the detection apparatus furthermore comprises scanning means by means of which the at least one imaging unit can be displaced with respect to the object and/or with respect to the detection means in at least one scanning direction.

4. A detection apparatus for the optical detection of an object comprising detection means, which can detect the light emerging from the object;

at least one imaging unit comprising first lens means having a plurality of lens elements arranged in the form of an array, through which light emerging from the object can pass;

second lens means, which are arranged between the first lens means and the detection means and can feed the light that has passed through the lens elements to the detection means;

wherein the second lens means have a plurality of lens elements arranged in the form of an array, and wherein the lens elements of the first and/or of the second lens means have, at least in sections, a cylinder geometry or a cylinder-like geometry, the detection apparatus furthermore comprises scanning means by means of which the at least one imaging unit can be displaced with respect to the object and/or with respect to the detection means in at least one scanning direction wherein the direction in which the lens elements of the first and/or of the second lens means are arranged next to one another in an array forms an angle not equal to 0° and/or 90° with the at least one scanning direction.

5. The detection apparatus as claimed in claim 1, wherein the detection apparatus comprises at least one first imaging unit and at least one second imaging unit.

6. The detection apparatus as claimed in claim 5, wherein the at least one first imaging unit has a resolution which differs from the resolution of the at least one second imaging unit.

7. A detection apparatus for the optical detection of an object comprising detection means, which can detect the light emerging from the object;

at least one imaging unit comprising first lens means having a plurality of lens elements arranged in the form of an array, through which light emerging from the object can pass;

second lens means, which are arranged between the first lens means and the detection means and can feed the light that has passed through the lens elements to the detection means;

wherein the second lens means have a plurality of lens elements arranged in the form of an array, and wherein the lens elements of the first and/or of the second lens means have, at least in sections, a cylinder geometry or a cylinder-like geometry, the detection apparatus comprises at least one first imaging unit and at least one second imaging unit, the detection apparatus comprises at least one first imaging unit and at least one second imaging unit, wherein the at least one first imaging unit has a higher resolution in a first direction (X) than in a second direction (Y) perpendicular thereto, whereas the at least one second imaging unit has a higher resolution in the second direction (Y) than in the first direction (X) perpendicular thereto.

8. The detection apparatus as claimed in claim 7, wherein the resolution of the at least one imaging unit can be varied.

9. The detection apparatus as claimed in claim 1, wherein at least some of the lens elements of the first and/or of the second lens means comprise at least two parts.

10. A detection apparatus for the optical detection of an object comprising detection means, which can detect the light emerging from the object;

at least one imaging unit comprising first lens means having a plurality of lens elements arranged in the form of an array, through which light emerging from the object can pass;

second lens means, which are arranged between the first lens means and the detection means and can feed the light that has passed through the lens elements to the detection means;

wherein the second lens means have a plurality of lens elements arranged in the form of an array, and wherein the lens elements of the first and/or of the second lens means have, at least in sections, a cylinder geometry or a cylinder-like geometry, at least some of the lens elements of the first and/or of the second lens means comprise at least two parts, wherein the lens elements comprising at least two parts can split the light that emerges from a point of the object and impinges on them into two partial beams in such a way that the points of impingement of said partial beams on the detection means can provide information about the position of the point in a direction (Z) perpendicular to the surface of the object.

11. A detection apparatus for the optical detection of an object comprising detection means, which can detect the light emerging from the object;

at least one imaging unit comprising first lens means having a plurality of lens elements arranged in the form of an array, through which light emerging from the object can pass;

second lens means, which are arranged between the first lens means and the detection means and can feed the light that has passed through the lens elements to the detection means;

the detection apparatus furthermore comprises scanning means by means of which the at least one imaging unit can be displaced with respect to the object and/or with respect to the detection means in at least one scanning direction, wherein the second lens means have a plurality of lens elements arranged in the form of an array, and wherein the lens elements of the first and/or of the second lens means have, at least in sections, a cylinder geometry or a cylinder-like geometry, wherein the scanning means are configured in such a way that, in a first scanning position, the light emerging from a point of the object impinges on a first point of impingement on the detection means, and that, in a second scanning position, the light emerging from the same point of the object impinges on a second point of impingement—at a distance from the first point of impingement—on the detection means, the points of impingement being able to provide information about the position of the point in a direction (Z) perpendicular to the surface of the object.

12. A method for operating a detection apparatus as claimed in claim 1, wherein, in a first method step, an object is imaged onto the detection means by a first imaging unit, which is displaced with respect to the object in the scanning direction, and wherein, in a second method step, the object is imaged onto the detection means by a second imaging unit, which is displaced with respect to the object in the same scanning direction.

13. The method as claimed in claim 12 wherein the imagings by the first imaging unit and by the second imaging unit are carried out with different resolutions.

14. A detection apparatus for the optical detection of an object comprising detection means, which can detect the light emerging from the object;

at least one imaging unit comprising first lens means having a plurality of lens elements arranged in the form of an array, through which light emerging from the object can pass;

second lens means, which are arranged between the first lens means and the detection means and can feed the light that has passed through the lens elements to the detection means;

wherein the second lens means have a plurality of lens elements arranged in the form of an array, and wherein the lens elements of the first and/or of the second lens means have, at least in sections, a cylinder geometry or a cylinder-like geometry wherein, in a first method step, an object is imaged onto the detection means by a first imaging unit, which is displaced with respect to the object in the scanning direction, and wherein, in a second method step, the object is imaged onto the detection means by a second imaging unit, which is displaced with respect to the object in the same scanning direction, wherein the imagings by the first imaging unit and by the second imaging unit are carried out with different resolutions in mutually perpendicular directions, the first imaging unit achieving a higher-resolution imaging in a first direction (X) and the second imaging unit achieving a higher-resolution imaging in the second direction (Y) perpendicular thereto.

15. The method as claimed in claim 12, wherein the image information items which are recorded successively by the detection means with the two imaging units are combined with one another in order to obtain a high-resolution image of the object.

16. A scanning apparatus, featuring a detection apparatus as claimed in claim 1.

17. A confocal microscope, featuring a detection apparatus as claimed in claim 1.

* * * * *